May 28, 1963 L. W. JOHNSON ET AL 3,091,298
DISK HARROW ANGLING AND STRAIGHTENING MEANS
Filed Sept. 14, 1961
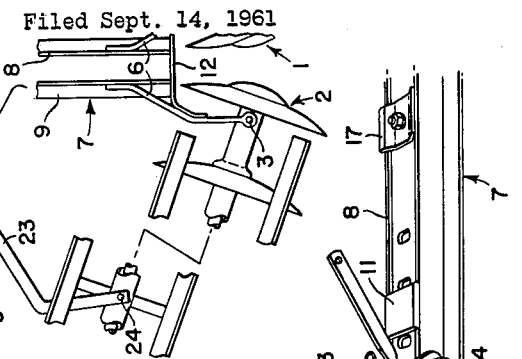
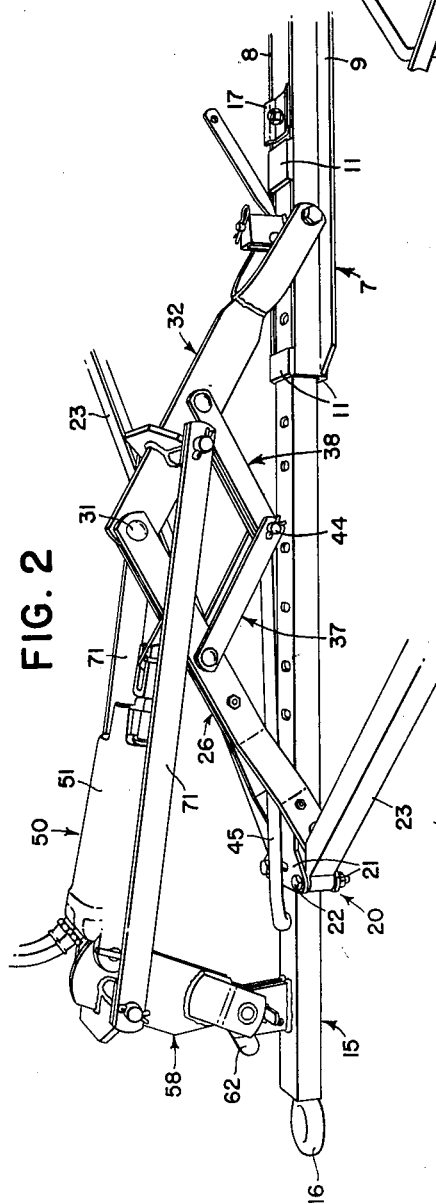
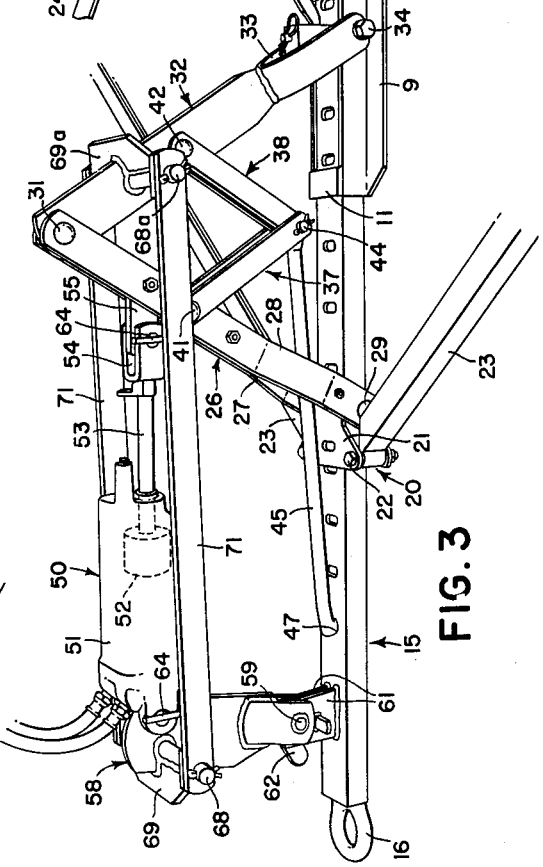
INVENTORS.
LESLIE W. JOHNSON
PERRY FORD
BY Roger C. Johnson
ATTORNEY

United States Patent Office 3,091,298
Patented May 28, 1963

3,091,298
DISK HARROW ANGLING AND STRAIGHTENING MEANS
Leslie W. Johnson, Moline, and Perry Ford, Rock Island, Ill., assignors to Deere & Company, Moline, Ill., a corporation of Delaware
Filed Sept. 14, 1961, Ser. No. 138,087
4 Claims. (Cl. 172—580)

This invention relates generally to agricultural implements and more particularly to disk harrows and the like. The object and general nature of this invention is the provision of new and improved means for straightening and angling the disk harrow gangs by a power operated unit, such as a hydraulic cylinder with which present day tractors are commonly equipped. More specifically, it is an important feature of this invention to provide power means for angling and straightening the gangs without imposing undue stresses on the associated parts of the harrow, particularly the drawbar and the parts that are slidably mounted thereon.

In previous harrows with which we are familiar, the disk harrow frame structure includes a generally fore-and-aft extending draft bar adapted to be connected to a propelling tractor and a pair of parts mounted for sliding movement on the drawbar and connected with opposite ends of the gang or gangs connected therewith, the power operated unit being carried by the drawbar and connected through motion multiplying means with the slide parts mounted on the drawbar. Under certain soil conditions, the power required to angle and straighten the gang or gangs may become considerable, in which case excessive force reactions may be imposed upon the harrow drawbar on which the power unit is mounted. In an effort to eliminate these objectionable reactions, efforts have heretofore been made to isolate the drawbar from such reactions and impose the latter on auxiliary frame parts or the like particularly designed to sustain the reactions involved. While harrows of this general type have been quite successful, particularly so far as protecting the harrow drawbar from excessive forces is concerned, it is the principal object of this invention to provide harrow angling and straightening means that not only does not impose any excessive forces on the harrow drawbar but, additionally does not require any extraneous frame parts for this purpose. Specifically, it is an important feature of this invention to provide what might be considered a power unit for angling and straightening the gangs of a disk harrow, in which the action and reaction of the operating forces are, in effect, self-contained and, without any additional frame parts, impose no undesirable bending stresses on any of the parts of the harrow frame and the associated gang angling means.

More particularly, it is a feature of this invention to provide motion multiplying means in the form of oppositely swingable arms connected, respectively, with the slidable parts that are mounted on the harrow drawbar and with the power unit, preferably in the form of a hydraulic cylinder, the connection being so constructed and arranged that the extending or retracting forces exerted by this cylinder act in directions that are substantially coplanar with respect to the associated cylinder-anchoring straps or other means that sustains the reactions developed as a result of an operation of the gang shifting means. Since these forces and their accompanying reactions are all exerted in substantially the same plane, there is no appreciable tendency to impose any undesirable bending forces on the harrow drawbar or other parts on which the cylinder is mounted.

These and other objects and advantages of this invention will be apparent to those skilled in the art after a consideration of the following detailed description of the preferred structural embodiment, taken in conjunction with the accompanying drawings illustrating said embodiment.

In the drawings:

FIG. 1 is a fragmentary top view of a portion of a disk harrow in which the principles of this invention have been incorporated.

FIG. 2 is an enlarged perspective view showing the position of the power unit and the associated angling linkage when the harrow gangs are shifted into their angled position, which is the position indicated in FIG. 1.

FIG. 3 is a view similar to FIG. 2, showing the position of the angling mechanism when the harrow gangs are in their straightened or transport position.

Referring now more particularly to FIG. 1, a disk harrow in which the principles of this invention have been incorporated include a pair of right- and left-hand disk gangs 1 and 2 connected at their inner ends, as at 3, to brackets 6 that form the rear portion of a central frame member 7. The latter member is made up of a pair of laterally spaced apart angles 8 and 9 suitably connected together at their front and rear ends, as at 11 and 12, by connective plates or other suitable means. Slidably or telescopically associated with the rear member 7 is a front member in the form of a drawbar 15 (FIG. 2) that preferably is in the form of a channel slidable between the angles 8 and 9. The drawbar 15 includes at its forward end a hitch eye 16 by which the harrow may be connected to the propelling tractor. A plate 17 is secured to the rear end of the channel member or drawbar 15 and cooperates with the plate 11 to form a stop for limiting the rearward movement of the rear frame member 7 with respect to the drawbar 15, the plate 17 being adapted to abut one of the plates 11 that form a connection between the front portions of the angles 8 and 9 (FIG. 2). As will be seen from FIG. 1, the rear end of the frame member 7 is connected to the inner ends of the disk gangs 1 and 2 through the bracket 6 and the plate 12.

Forward of the frame member 7, the drawbar 15 receives a slide member 20 that is made up of upper and lower plates 21 suitably connected together by bolts and spacers 22. The forward portions of the plates 21 are extended laterally so that the forward ends of a pair of angling bars 23 may be pivotally connected, respectively, to the bolts 22. The rear ends of the angling bars 23, which may be in the form of angles, are connected to the outer ends of the disk gangs, as at 24, FIG. 1.

The means for shifting the members 7 and 20 relative to the drawbar 15 for angling and straightening the gangs, with which the present invention is particularly concerned, will now be described.

A front generally vertically disposed arm 26, made up of two straps 27 and 28, has a lower divergently shaped end pivotally connected, by a pair of studs 29, to the sides of the forward slide member 20, and the upper end of the forward arm 26 is pivotally connected, as at 31, to a rear arm 32, the latter also being generally vertically disposed and having a bifurcated lower end 33 spanning the forward portion of the rear frame member 7, being pivotally connected therewith by pivots 34 carried respectively by the angles 8 and 9. Two equalizing links 37 and 38 are pivotally connected at their outer ends, as at 41 and 42, to intermediate points on the arm 26 and 32, and the links 37 and 38 are interconnected by pivot pin 44, which also serves as means connecting the rear end of an anchoring link 45 that is connected at its forward end to an opening 47 in the forward portion of the drawbar 15. This construction, as so far described, is similar to the corresponding arrangement shown in U.S. Patent 2,527,607, which issued October 31, 1950, to Charles H. White, and serves to connect the front and rear arms 26 and 32 with the drawbar 15 so that when the lower end of the rear arm 32 is shifted forwardly relative to the drawbar 15, the lower end of the other arm 26 is shifted rearwardly, and vice-versa.

According to this invention, power means 50 is connected to act between the front and rear arms 26 and 32 to angle and straighten the gangs without imposing any bending stresses on the drawbar 15 and the means by which this is accomplished will now be described.

The power unit 50 is in the nature of a hydraulic cylinder 51 enclosing a piston 52 connected to the forward end of the piston rod 53 that extends rearwardly out of the rear end of the cylinder and is connected by a yoke 54 to a lug 55 that is fixed to the intermediate portion of the forward arm 26 immediately above the pivot 41. The forward end of the cylinder 51 is connected to a cylinder-attaching arm 58 that is swingably connected at its lower end through a pivot pin 59 with a pair of lugs 61 carried by the forward end of the drawbar 15. The lugs 61 form a part of an attaching latch structure, the detent of which is indicated at 62. This particular latch structure is shown in U.S. Patent 2,686,648, issued to William P. Oehler, August 17, 1954. The forward end of the cylinder is releasably connected to the upper end of the cylinder attaching arm 58 by means of a conventional quick detachable pin 64, and a similar pin detachably connects the rear end of the piston rod 53 with the lug 55 that is rigidly fixed to the arm 26.

The upper portion of the cylinder-attaching arm 58 carries a transverse bar 68 that is rigidly fixed to the arm 58 and reinforced by a transverse plate 69. A pair of anchoring straps 71 are connected at their forward ends to the bar 68 and at their rear ends are connected to a similar bar 68a fixed rigidly to the rear arm 32 and reinforced by a transverse plate 69a.

As will be seen, particularly from FIGS. 2 and 3, the anchoring links 71 lie substantially in the same horizontal plane as the piston rod 53, said plane containing the pivots 64 and the pivots formed by the front and rear bars 68 and 68a. The purpose of this particular arrangement is to eliminate all bending stresses in any of the associated parts, particularly the drawbar 15. By confining the active and reactive forces, created whenever the power unit 50 is operated to extend or retract the piston rod 53, to what may be considered a self-contained arrangement, the disk gangs may be angled or retracted, as desired, without imposing any undesired stresses on the drawbar 15. In other words, whenever, for example, the piston rod 53 is retracted, to swing the parts from the position shown in FIG. 3 to the position shown in FIG. 2, the disk gangs are shifted by a direct pull against the front arm 26 and a direct push on the other arm 32, the action and reaction, being exerted in a more or less common plane, impose no undesired stresses on any other parts, particularly the drawbar 15, that might cause bending or breakage thereof.

While we have shown and described above the preferred structure in which the principles of the present invention have been incorporated, it is to be understood that our invention is not to be limited to the particular details, shown and described above, but that, in fact, widely different means may be employed in the practice of the broader aspects of our invention.

What we claim, therefore, and desire to secure by Letters Patent is:

1. In a disk harrow, a drawbar, a pair of members slidable in opposite directions on said drawbar, a pair of generally vertically disposed arms hingedly connected together at their upper ends, means pivotally connecting the lower ends of said arms to said members, respectively, a power unit including a cylinder and a retractable and extensible piston rod, means pivotally connecting the outer end of the piston rod to one of said arms, a cylinder attaching arm pivoted to the forward end of said drawbar, means connecting said cylinder to said attaching arm, and means including strap means lying substantially in the plane of the piston rod for connecting the cylinder with the other arm, said strap means including a pair of straps disposed on opposite sides of said cylinder, and a first transverse shaft means connecting the forward ends of said straps to said cylinder attaching arm and a second transverse shaft means connecting the rear ends of said straps to said one of said arms.

2. In a disk harrow comprising a drawbar, a pair of members slidable in opposite directions on said drawbar, a pair of generally upwardly extending arms, means hingedly connecting said arms together at their upper ends, means pivotally connecting the lower ends of said arms to said members, respectively, a pair of generally downwardly extending links hingedly connected together at their lower ends, means pivotally connecting the upper ends of said links to midportions of said arms, respectively, and means fixing the lower ends of said links against relative longitudinal movement with respect to said drawbar, the improvement comprising: extensible and retractable force applying means having a primary force applying portion and a reactive force applying portion, first force transmitting means interconnecting the primary force applying portion with a portion of one of said arms, and second force transmitting means disposed about said first force transmitting means and interconnecting the reactive force applying portion with a portion of the other of said arms.

3. The invention set forth in claim 2, further characterized by said portions of said arms being spaced an equal distance from the arm hinge means.

4. In a disk harrow comprising a drawbar, a pair of members slidable in opposite directions on said drawbar, a pair of generally upwardly extending arms, hinge pin means hingedly connecting said arms together at their upper ends, means pivotally connecting the lower ends of said arms to said members, respectively, a pair of generally downwardly extending links hingedly connected together at their lower ends, means pivotally connecting the upper ends of said links to the midportion of said arms, respectively, and means fixing the lower ends of said links against relative longitudinal movement with respect to said drawbar, the improvement comprising: a hydraulic ram including a piston and a cylinder, piston rod means interconnecting said piston to a portion of one of said arms, said portion being spaced a first distance from said hinge pin, and strap means disposed on opposite sides of said piston rod and interconnecting said cylinder to a portion of the other of said arms, said portion on the other of said arms being spaced a distance from the hinge pin equal to the first distance.

References Cited in the file of this patent
UNITED STATES PATENTS
2,527,607    White _____ Oct. 31, 1950